US006728822B1

(12) United States Patent
Sugawara et al.

(10) Patent No.: US 6,728,822 B1
(45) Date of Patent: Apr. 27, 2004

(54) BUS BRIDGE CIRCUIT, INFORMATION PROCESSING SYSTEM AND CARDBUS CONTROLLER

(75) Inventors: Takashi Sugawara, Yokohama (JP); Hirohide Komiyama, Zama (JP); Hidenobu Hanami, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,130

(22) Filed: Mar. 10, 2000

(30) Foreign Application Priority Data

Mar. 12, 1999 (JP) ............................................. 11-066547

(51) Int. Cl.⁷ ............................................... G06F 13/36
(52) U.S. Cl. ........................................ 710/311; 710/301
(58) Field of Search .......................... 710/311, 21, 306, 710/6, 301–304; 341/22

(56) References Cited

U.S. PATENT DOCUMENTS

| | | | | |
|---|---|---|---|---|
| 5,596,715 A | * | 1/1997 | Klein et al. ..................... 714/43 |
| 5,729,762 A | * | 3/1998 | Kardach et al. ............... 710/22 |
| 5,875,293 A | * | 2/1999 | Bell et al. ....................... 714/27 |
| 5,911,084 A | * | 6/1999 | Jones et al. .................... 710/62 |
| 5,918,069 A | * | 6/1999 | Matoba .......................... 710/21 |
| 5,920,891 A | * | 7/1999 | Steinbach et al. ........... 711/146 |
| 5,978,858 A | * | 11/1999 | Bonola et al. .................. 710/1 |
| 6,073,855 A | * | 6/2000 | MacKenthun ................. 235/492 |
| 6,085,269 A | * | 7/2000 | Chan et al. ................... 710/306 |
| 6,189,063 B1 | * | 2/2001 | Rekeita et al. ............... 710/311 |
| 6,256,689 B1 | * | 7/2001 | Khosrowpour ............... 710/30 |
| 6,256,692 B1 | * | 7/2001 | Yoda et al. ................... 710/301 |
| 6,304,988 B1 | * | 10/2001 | Levy ............................ 714/726 |
| 6,311,296 B1 | * | 10/2001 | Congdon ..................... 710/301 |
| 6,429,793 B1 | * | 8/2002 | Paolini .......................... 341/22 |
| 6,567,882 B1 | * | 5/2003 | Onagawa ..................... 710/314 |

* cited by examiner

Primary Examiner—Paul R. Myers
(74) Attorney, Agent, or Firm—Louis H. Percello; Anne V. Dougherty

(57) ABSTRACT

A jumper (60) is provided as a control input means for switching operation modes of a CardBus controller (42). Also, a bidirectional bypass path (40A, 66, 58A) is provided in parallel with the controller. When a passthrough mode signal (64) from the jumper exhibits an inactive state, the controller is enabled for operation and the bypass path is disabled for operation, thereby to cause the controller to be operated in its normal mode. On the other hand, when the passthrough mode signal exhibits an active state, the controller is disabled for operation and the bypass path is enabled for operation, thereby to cause predetermined signals on PCI bus signal lines (40A), or signals on CardBus signal lines (58A) corresponding with the predetermined signals to be output on the CardBus or PCI bus as they are via the bypass path. In order to inspect transactions on the PCI bus, a PCI bus analyzer or exerciser is connected to a PC card slot (44A), to which the bypass path is connected.

20 Claims, 7 Drawing Sheets

[Figure 1]
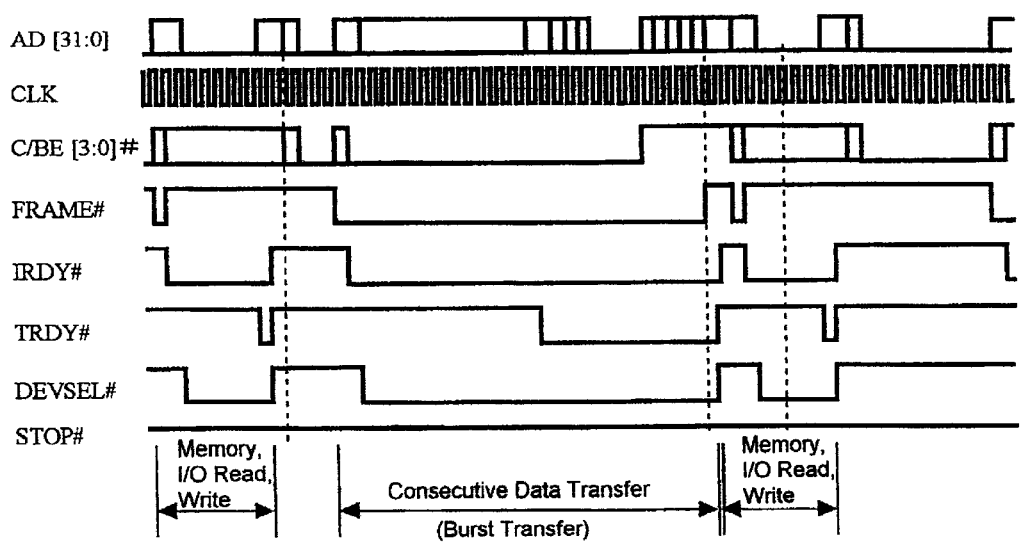

[Figure 2]
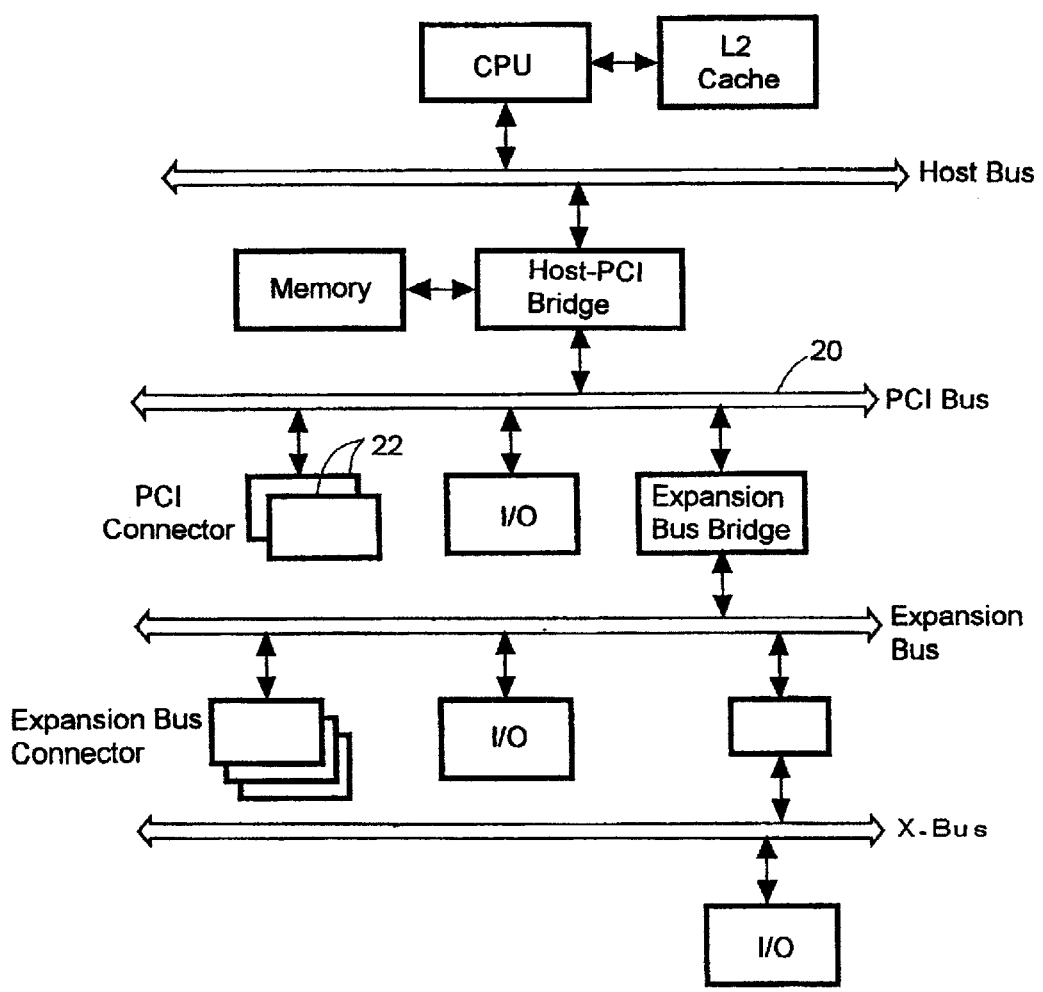

[Figure 3]
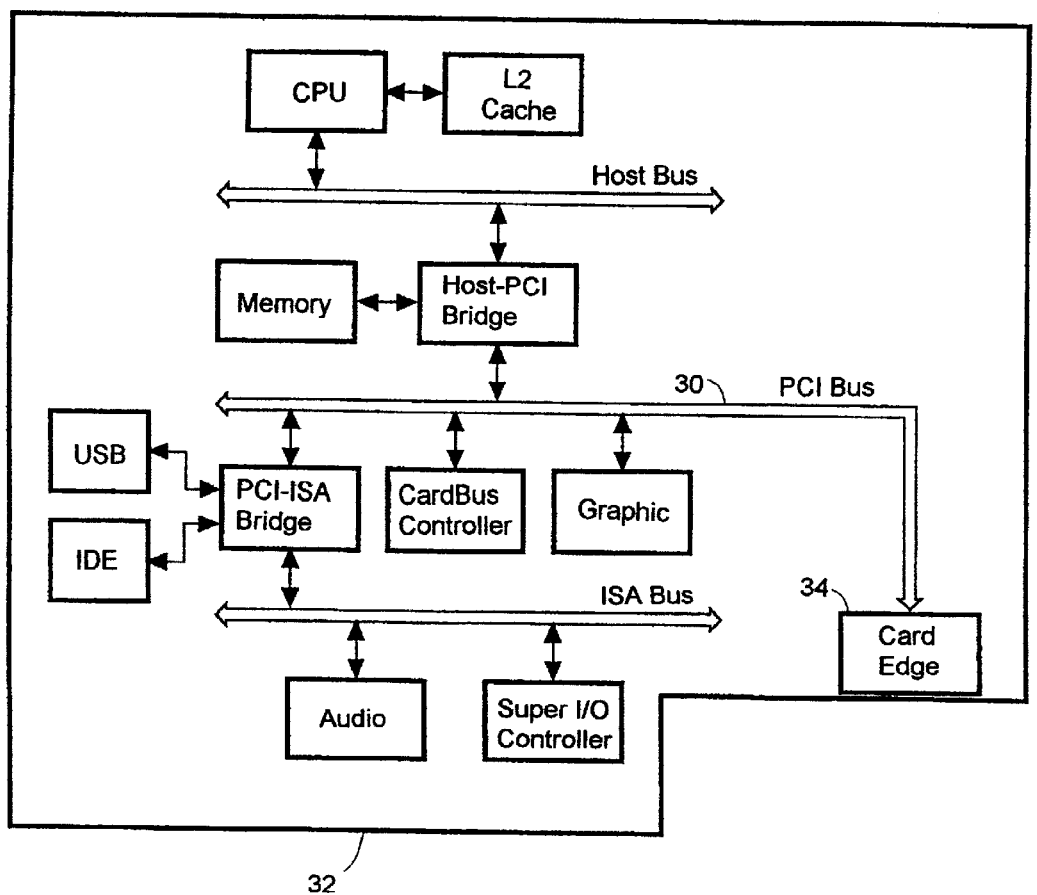

[Figure 4]
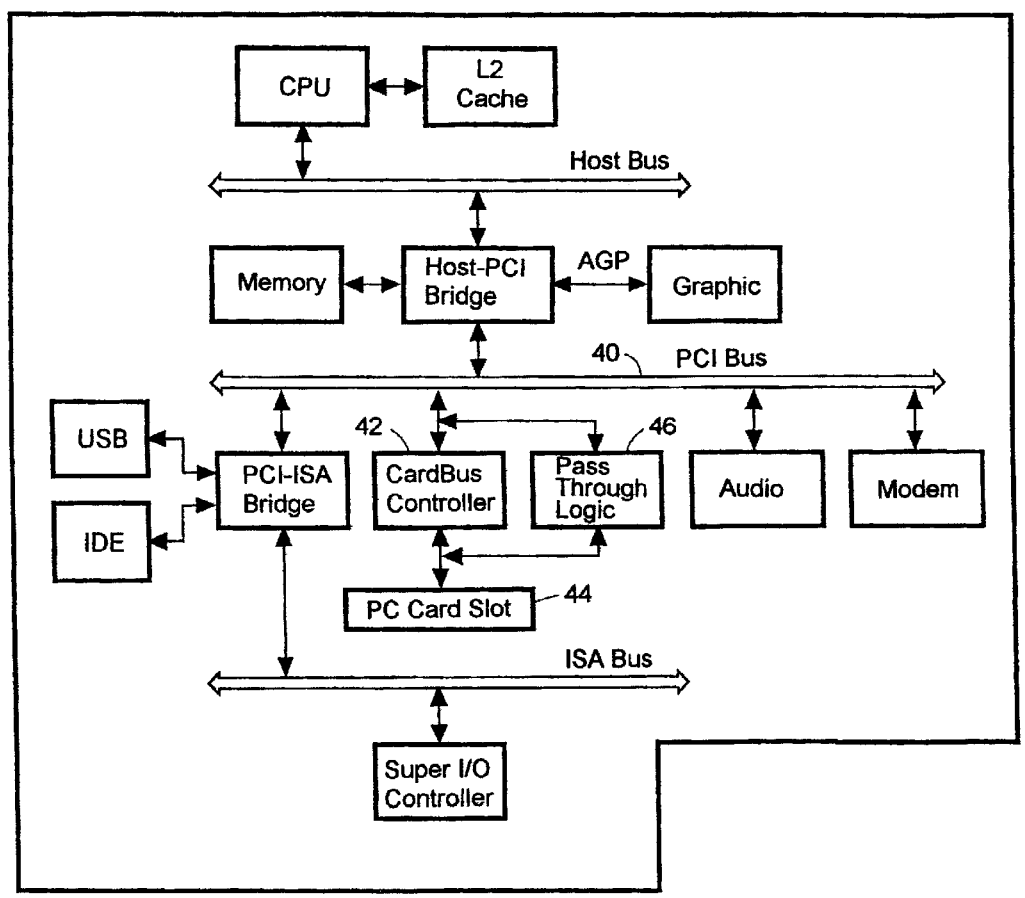

[Figure 5]
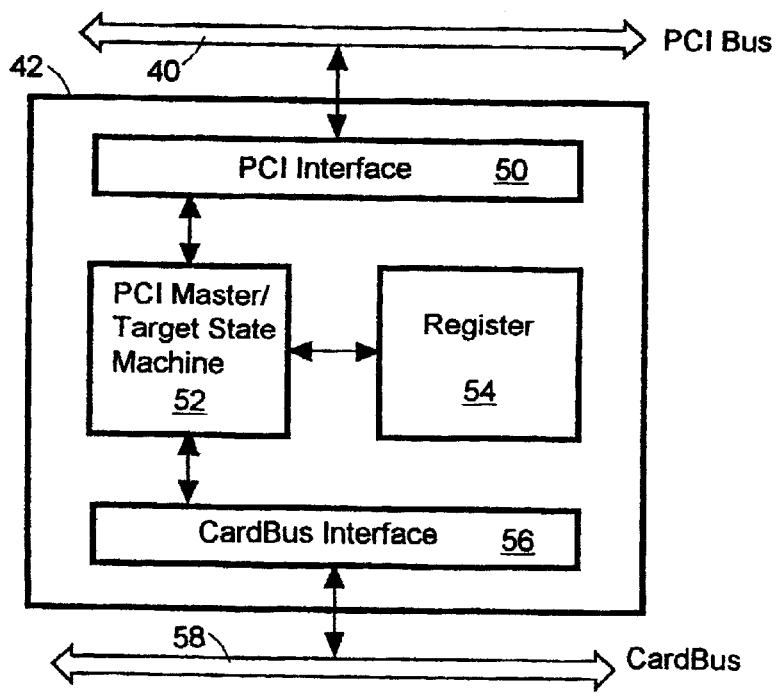

[Figure 6]
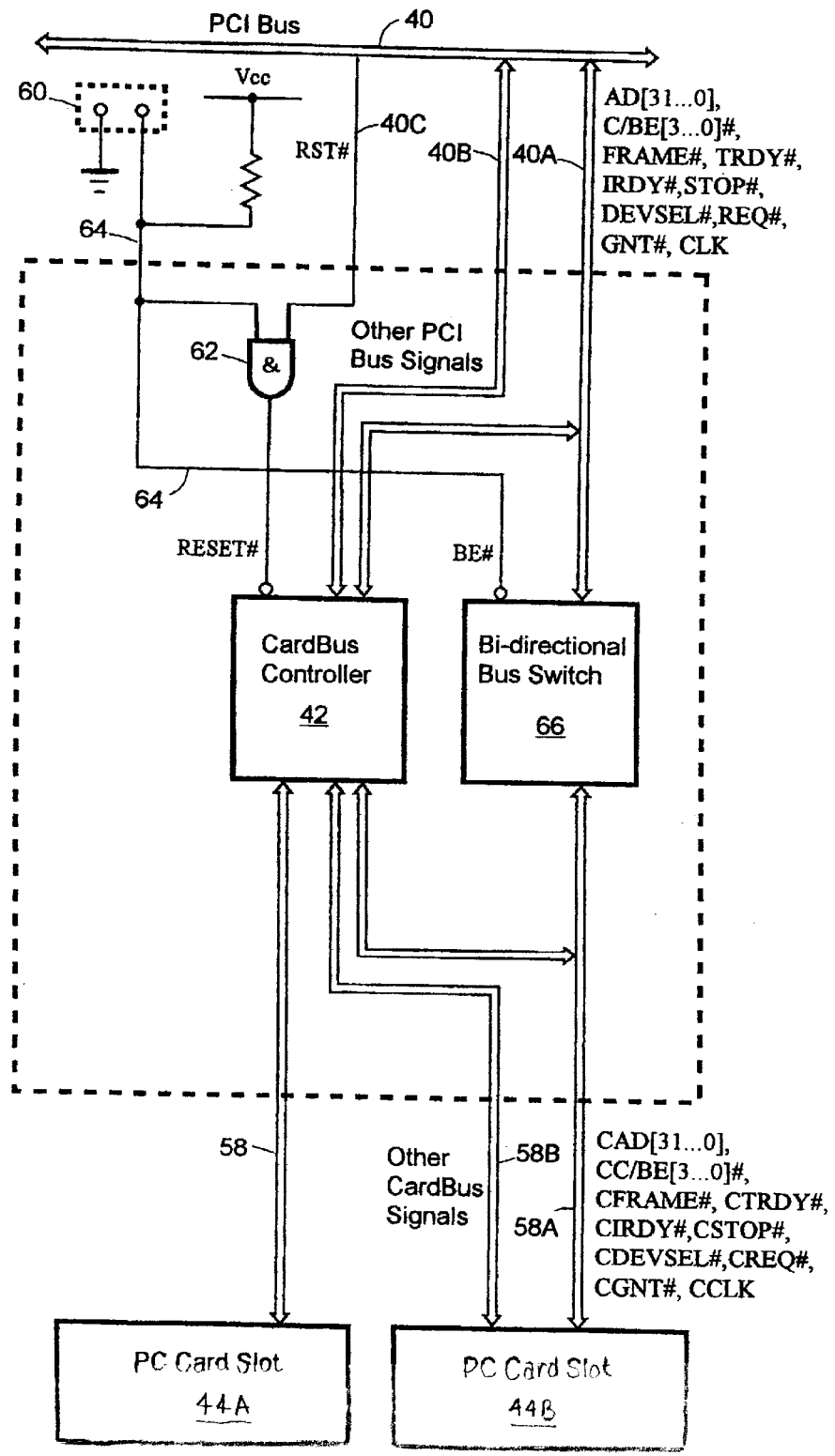

[Figure 7]
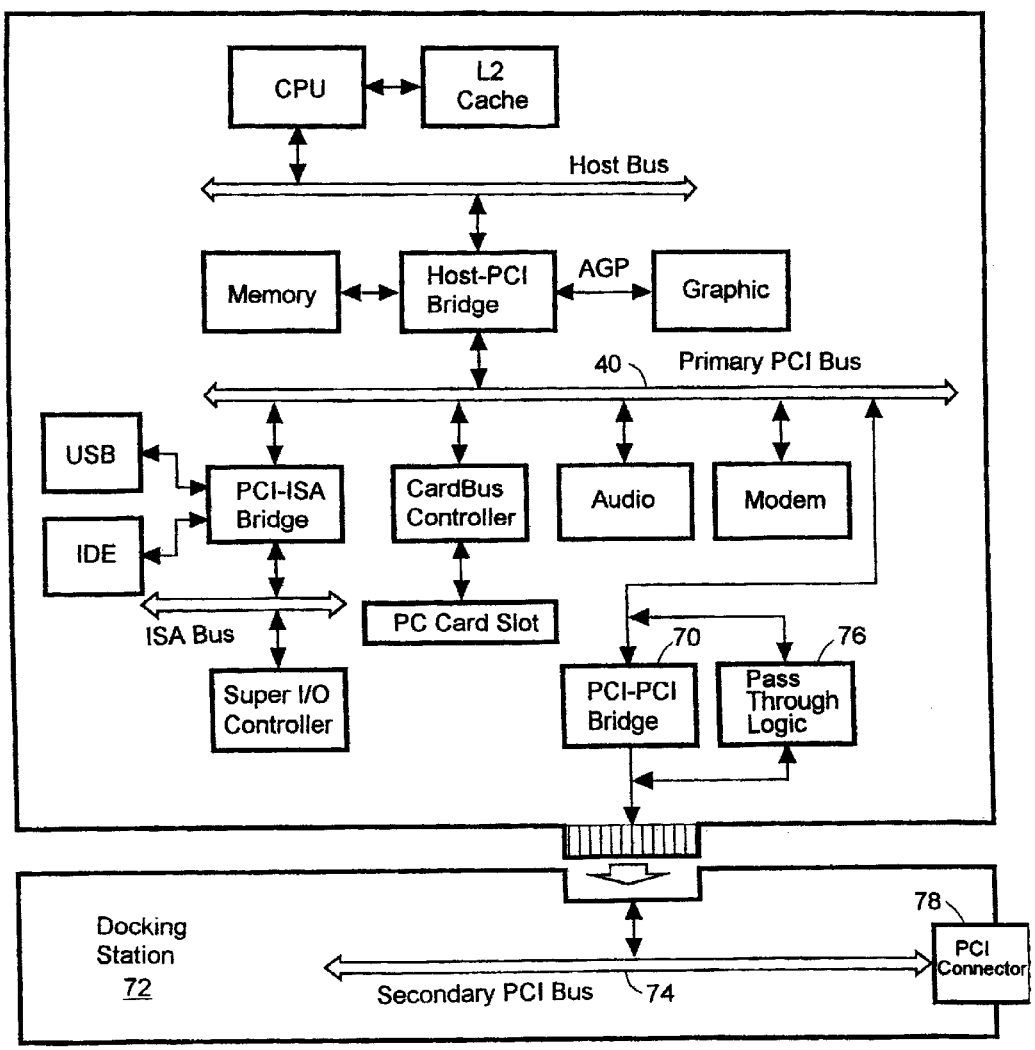

BUS BRIDGE CIRCUIT, INFORMATION PROCESSING SYSTEM AND CARDBUS CONTROLLER

FIELD OF THE INVENTION

This invention relates to an improvement of a bus bridge circuit for use in an information processing system (e.g., personal computer) with a plurality of buses, wherein the bus bridge circuit (e.g., CardBus controller) is connected between a primary bus (e.g., PCI bus) that is directly inaccessible to a user and a secondary bus (e.g., CardBus) that is directly accessible to a user. More specifically, this invention is arranged to add a logic circuit for implementing a special mode called "passthrough" to a bus bridge circuit, thereby enabling to perform nondestructive inspections (tests) of transactions on the primary bus from a connector or a slot of the bus bridge circuit.

BACKGROUND OF THE INVENTION

In case of performing a failure analysis of a personal computer (hereafter abbreviated to "PC") at an arbitrary time during its development/production/operational phase, a PCI bus analyzer or exerciser is often used for inspecting transactions on a (primary) PCI bus as a system bus of the PC to investigate a failure mode.

Incidentally, as a PCI bus analyzer or exerciser that is usable with this invention, there is a "32/64 Bits, PCI Exerciser & Analyzer System" commercially available from Hewlett Packard Corp., which is a member of the family called "HP E2920 Computer Verification Tool, PCI Series".

It is important to inspect transactions on a PCI bus, since every I/O transfer or memory transfer within a PC is performed via a host-PCI bridge and, thus, a PCI bus is involved in all transactions. In the following, backgrounds of transaction inspections will be briefly described.

As well known in the art, those signal lines that are required to get hold of basic data transfers on a PCI bus include at least forty-two signal lines, listed below, among a larger number of signal lines that are common to one or more peripheral devices connected to the PCI bus.

AD[31:0] (Address/Data)
CLK (Clock)
C/BE[3:0]# (Bus Command/Byte Enable)
FRAME# (Cycle Frame)
IRDY# (Initiator Ready)
TRDY# (Target Ready)
DEVSEL# (Device Select)
REQ# (Request)
GNT# (Grant)□□
STOP# (Stop) Note that a signal line with a symbol "#" is negative logic, i.e., low level=active.

In FIG. 1, there is schematically shown three normal transactions (bus cycles) on a PCI bus, which can be observed through bus signals appearing on these signal lines. For the purpose of estimating that any one of the transactions would be abnormal and, thus, there would be a failure within a PC under inspection, a PCI bus analyzer or the like is widely used: (1) to detect such a condition that the TRDY# signal line is not activated in synchronism with the currently active IRDY# signal line; and (2) to visually confirm any inequality between data on the AD[31:0] signal lines and predicted data, which was previously programmed.

Incidentally, in actual environments, physical conditions such as loads of a PCI bus (e.g., the number of PCI devices connected thereto) or effective line lengths may vary from one to another. Thus, it is difficult to precisely measure wave forms of signals on a PCI bus. However, even so, it is possible to get an entire image of each transaction on a PCI bus. Also, from such an entire image, it is possible to envision abnormality of each transaction to the extent that the purpose of inspection can be fully accomplished.

In FIG. 2, there is shown a schematic configuration of a desktop PC. In this desktop PC, optional slots or PCI connectors 22 are directly connected to a PCI bus 20 as usual. Accordingly, if a PCI bus analyzer or the like is connected to either one of PCI connectors 22, transactions on PCI bus 20 can be inspected in an easier manner. However, for a desktop PC of the special type that has no PCI connector and/or a desktop PC that has no unused PCI connector, such an approach cannot be adopted as it is.

On the other hand, a notebook PC (hereafter abbreviated to "note PC") has a limitation on its physical size. For this reason, a note PC of conventional type does not have a PCI connector as provided in a desktop PC. Stated in another way, a PCI bus of such a note PC is closed therein. Accordingly, in order to inspect transactions on a PCI bus, it becomes necessary to do cumbersome work, which includes disassembling of a note PC's system unit and outwardly extending those signal lines that are required for inspecting the transactions. Apparently, this is a crucial factor detrimental to efficiency of the inspection process.

In a note PC of the special type shown in FIG. 3, one or more tabs are provided at a card edge 34 on a main board 32 so that transactions on a PCI bus 30 can be inspected through the tabs. If a PCI bus analyzer or the like is connected to the card edge 34, transactions on PCI bus 30 can be inspected in an easier manner at the main board 32. Note in this respect, however, that the card edge 34 is made inaccessible to an outside user, thereby to avoid occurrence of any accidental event such as short-circuit or the like. Thus, in the form of a product incorporating the main board 32, there is no way to readily access the card edge 34 and, therefore, transactions on PCI bus 30 cannot be inspected without disassembling the note PC's system unit.

In view of the aforesaid problems of the prior art, it is an object of this invention to improve a bus bridge circuit for use in an information processing system with a plurality of buses, wherein the bus bridge circuit is connected between a primary bus that is not directly accessible to a user and a secondary bus that is directly accessible to a user.

It is another object of this invention to add a logic circuit for implementing a special mode called "passthrough" to a bus bridge circuit, thereby enabling nondestructive inspections of transactions on the primary bus from a connector or a slot of the bus bridge circuit.

It is another object of this invention to provide an information processing system that has the aforesaid improved bus bridge circuit.

SUMMARY OF THE INVENTION

The foregoing and other objects of the invention are realized by system including a bus bridge circuit connected between a primary bus which is not directly accessible to a user and a secondary bus that is directly accessible to a user. The inventors herein have discerned that a number of note PCs are provided with CardBus controllers (alternatively called "PC card controller" or "PCI-CardBus bridge"), which are freely accessible to users. In particular, the present inventors have discerned that a secondary bus of a CardBus controller (i.e., CardBus) has been designed based on the architecture of a PCI bus and, hence, signals on a PCI bus may be easily inspected through a CardBus as they are.

A first aspect of this invention in accordance with these findings resides in a bus bridge circuit for use in an information processing system having a primary bus that is directly inaccessible to a user, one or more peripheral devices connected to the said primary bus, and a secondary bus that is directly accessible to a user, comprising: a control input means for switching operation modes of said bus bridge circuit, which is connected between said primary bus and said secondary bus; and a bypass path provided between an input side and an output side of said bus bridge circuit; whereby in case that a passthrough mode signal from said control input means exhibits an inactive state, said bus bridge circuit is enabled for operation and said bypass path is disabled for operation, thereby to cause said bus bridge circuit to be operated in its normal mode; and in another case that the passthrough mode signal from said control input means exhibits an active state, said bus bridge circuit is disabled for operation and said bypass path is enabled for operation, thereby to cause predetermined bus signals of a plurality of bus signals on said primary bus to be output on said secondary bus as they are via said bypass path.

In the first aspect, it is preferable that said primary bus is a PCI bus, said secondary bus is a CardBus, said bus bridge circuit is a CardBus controller, said predetermined bus signals are PCI bus signals that are common to said peripheral devices, and a PCI bus analyzer or the like is connected to said CardBus, whereby transactions on said PCI bus can be inspected through said CardBus during said passthrough mode.

Alternatively, it is preferable that said primary bus is a primary PCI bus, said secondary bus is a secondary PCI bus, said bus bridge circuit is a PCI-PCI bridge circuit, said predetermined bus signals are primary PCI bus signals that are common to said peripheral devices, and a PCI bus analyzer or the like is connected to said secondary PCI bus, whereby transactions on said primary PCI bus can be inspected through said secondary PCI bus during said passthrough mode.

A second aspect of this invention resides in a CardBus controller for use in an information processing system having a PCI bus, one or more peripheral devices connected to the said PCI bus, and a CardBus, comprising: a control input means for switching operation modes of said CardBus controller, which is connected between said PCI bus and said CardBus; and a bidirectional bypass path provided between an input side and an output side of said CardBus controller; whereby in case that a passthrough mode signal from said control input means exhibits an inactive state, said CardBus controller is enabled for operation and said bypass path is disabled for operation, thereby to cause said CardBus controller to be operated in its normal mode; and in another case that the passthrough mode signal from said control input means exhibits an active state, said CardBus controller is disabled for operation and said bypass path is enabled for operation, thereby to cause at least those bus signals of a plurality of bus signals on said PCI bus that are common to said PCI devices, or those bus signals on said CardBus corresponding with said common bus signals to be output on said CardBus or said PCI bus as they are via said bypass path.

In this aspect, it is preferable that a PCI bus exerciser is connected to said CardBus, whereby transactions on said PCI bus can be interactively inspected through said CardBus during said passthrough mode.

In the first and second aspects of this invention, it is preferable that said active state or said inactive state of said passthrough mode signal is determined by setting of a jumper pin.

A third aspect of this invention resides in an information processing system, which has the aforesaid bus bridge circuit or CardBus controller.

BRIEF DESCRIPTION OF THE DRAWINGS

The invention will now be described in greater detail with specific reference to the appended drawings wherein:

FIG. 1 is a timing chart schematically showing normal transactions (PCI bus cycles), which can be observed through bus signals appearing on predetermined signal lines of a PCI bus;

FIG. 2 is a block diagram showing a schematic configuration of a desktop PC, which has a PCI connector as an optional slot on a PCI bus;

FIG. 3 is a block diagram showing a schematic configuration of a note PC of special type, which has one or more tabs at a card edge on a main board so that transactions on a PCI bus can be inspected through the tabs;

FIG. 4 is a diagram showing a schematic hardware configuration of a note PC in accordance with this invention;

FIG. 5 is a block diagram showing a schematic configuration of a conventional CardBus controller;

FIG. 6 is a block diagram showing a schematic configuration of a combination (preferred embodiment) of a conventional CardBus controller and a passthrough logic circuit added thereto in accordance with this invention; and FIG. 7 is a block diagram showing a schematic configuration of a combination (alternative embodiment) of a conventional PCI-PCI bridge and a passthrough logic circuit added thereto in accordance with this invention.

DETAILED DESCRIPTION OF THE INVENTION

In FIG. 4, there is shown a schematic hardware configuration of a note PC in accordance with this invention. This note PC has substantially the same configuration as a conventional note PC, except that a passthrough logic circuit 46 is added in parallel with a CardBus controller 42, which is connected between a PCI bus 40 and a CardBus (FIG. 5), and that a PCI bus analyzer or exerciser (not shown) is connected to a PC card slot 44. Accordingly, for brevity of description of the specification and drawings, only those configurations and operations of the CardBus controller 42 and the passthrough logic circuit 46 will be described below.

In FIG. 5, there is shown a schematic configuration of the CardBus controller 42, which is similar to "PCI1250A PC Card Controller" commercially available from Texas Instruments Inc. The CardBus controller 42 has two PC card slots 44 (FIG. 6), each conforming to the "1995 PC Card Standard". It is assumed herein that these PC card slots 44 are connected to a CardBus 58 respectively.

As well known in the art, the CardBus controller 42 is capable of bidirectionally transferring data between PCI bus 40 and CardBus 58. This is because the CardBus controller 42 has its components 50 to 56 for passing (bridging) data through transactions in accordance with the specifications of PCI bus 40 and CardBus 58 respectively. Note, however, that PCI bus 40 and CardBus 58 are independent of each other, which causes a transfer of bus signals between a PCI interface 50 and a state machine 52 to be carried out independently of another transfer of bus signals between a state machine 52 and a CardBus interface 56. Accordingly, even if a PCI bus analyzer or exerciser is simply connected to either one of the PC card slots 44, transactions on PCI bus 40 cannot be inspected in a proper manner.

The present inventors have conceived this invention after discerning that, even though a conventional CardBus controller 42 has limitations as described above, nevertheless CardBus 58 is designed pursuant to the architecture of PCI bus 40 and, thus, it allows bus signals on PCI bus 40 to be mostly inspected as they are through CardBus 58. Namely, a basic concept of this invention resides in adding the passthrough logic circuit 46 (FIG. 4) in parallel with the CardBus controller 42, whereby at least those bus signals of a plurality of bus signals on PCI bus 40 that are common to one or more PCI devices (or those bus signals on CardBus 58 corresponding with the said common bus signals) may be output on CardBus 58 (or PCI bus 40) as they are for use in resultant inspection of transactions on PCI bus 40.

In FIG. 6, there is shown a schematic configuration of a combination of a conventional CardBus controller 42 and a passthrough logic circuit added thereto in accordance with this invention. Major components of the passthrough logic circuit includes a jumper 60 that functions as a control input means for switching operation modes of the CardBus controller 42, an AND gate 62 for enabling/disabling the CardBus controller 42 in response to an inactive/active state of a passthrough mode signal, a line 64 for conveying a BE# (Bus Enable) signal in response to an active passthrough mode signal, and a bidirectional bus switch 66.

AND gate 62 may be comprised of the positive-AND gate called "HC08" commercially available from Texas Instruments Inc., whereas the bidirectional bus switch 66 may be comprised of the bus switch called "PI5C32X384" commercially available from Pericom Semiconductor Inc. In an actual configuration, it is necessary to provide a plurality of the bidirectional bus switches 66 depending on an actually used bit width, but for brevity of the drawings, only a single bidirectional bus switch 66 is shown.

As shown, a plurality of bus signals on PCI bus 40 branch to and appear on PCI bus signal lines 40A to 40C respectively. The PCI bus signal lines 40A comprise at least forty-two signal lines, which are common to one or more PCI devices (AD[31:0], C/BE[3:0]#, FRAME#, TRDY#, IRDY#, STOP#, DEVSEL#, REQ#, GNT# and CLK). The PCI bus signal lines 40B comprise other signal lines except the RST# (Reset) signal line. The RST# signal is normally used for resetting the CardBus controller 42 at power-on time.

Similarly, on the side of a PC card slot 44A where a PCI bus analyzer or exerciser is connected, a plurality of bus signals on CardBus 58 branch to and appear on CardBus signal lines 58A and 58B respectively. The CardBus signal lines 58A comprise at least forty-two signal lines, which correspond with the PCI bus signal lines 40A (CAD[31:0], CC/BE[3:0]#, CFRAME#, CTRDY#, CIRDY#, CSTOP#, CDEVSEL#, CREQ#, CGNT# and CCLK). The CardBus signal lines 58B comprise other CardBus signals lines.

Next, operations of the circuit configuration of this invention as shown in FIG. 6 will be described. When the CardBus controller 42 is to be operated in its normal mode, a jumper plug (not shown) is removed from jumper 60 to pull up the potential at an ungrounded jumper pin to a higher positive level. As a result, both of the AND gate 62 and BE# signal line 64 turn to be inactive; and, thus, the CardBus controller 42 is capable of bidirectionally bridging the bus signals between PCI bus 40 and CardBus 58 as a whole. In this case, conventional PC card(s) conforming to the specification of CardBus 58 may be connected to either one or both of the PC card slots 44A and 44B.

Conversely, when the circuit configuration of FIG. 6 is to be operated in a passthrough mode, a jumper plug is attached to jumper 60 to pull down the potential at said jumper pin to a ground level. In response to this ground level (i.e., an active passthrough mode signal), AND gate 62 applies a RESET# (Reset) signal to the CardBus controller 42 for initializing the same and causing its output to exhibit a high impedance (heavy load state). Thus, at this point of time, the CardBus controller 42 is disabled for operation. At the same time, a BE# signal on line 64 is applied to the bidirectional bus switch 66 for causing it to be turned on. Accordingly, at this stage, bus signals on the PCI bus signal lines 40A are transferred through the bidirectional bus switch 66 as corresponding bus signals on the CardBus signal lines 58A, and vice versa. In short, the bidirectional bus switch 66 functions as a key element of a bidirectional bypass path, which is added in parallel with the CardBus controller 42.

As shown, the CardBus signal lines 58A, extending from the bottom of the bidirectional bus switch 66, are only connected to the PC card slot 44A. Accordingly, in order to inspect transactions on PCI bus 40 during the passthrough mode, a PCI bus analyzer or exerciser must be connected to the PC card slot 44A alone.

Obviously, in order to terminate the passthrough mode and to cause the CardBus controller 42 to be operated in its normal mode again, it is only necessary to remove the presently attached jumper plug from jumper 60.

In the above, the preferred embodiment of this invention has been described. However, it is apparent that the form of exploitation of this invention is not limited thereto. By way of example, in an alternative embodiment as schematically shown in FIG. 7, it is possible to add a passthrough logic circuit 76, which has a configuration similar to that of the passthrough logic circuit 46 of FIG. 4 (see FIG. 6 for more detail), in parallel with a conventional PCI-PCI bridge 70 for bridging a primary PCI bus 40 in a note PC's system unit and a secondary PCI bus 74 in a docking station 72. Namely, in such an alternative embodiment, whenever a combination of the PCI-PCI bridge 70 and passthrough logic circuit 76 is placed in the passthrough mode as a whole, it is possible to nondestructively inspect transactions on the primary PCI bus 40 from a PCI connector 78 provided at an end of the secondary PCI bus 74 in the docking station 72 by means of connecting a PCI bus analyzer or exerciser to the PCI connector 78.

Also, instead of using jumper 60 provided in the preferred embodiment of FIG. 6 as a control input means for switching operation modes of the CardBus controller 42, it is possible to use a general-purpose programmable I/O register provided in a PCI-ISA bridge or the like, thereby to supply a passthrough mode signal from its particular bit position.

Further, in place of transferring signals on at least forty-two PCI bus signal lines through the bidirectional bypass path as done in the above described embodiments (FIGS. 6 and 7), it is possible to transfer signals on all of the PCI bus signal lines in substantially the same manner.

Moreover, application of this invention is not limited to a PCI bus alone. Namely, this invention may be applied to other internal buses such as a host bus and an ISA bus as well. As for an information processing system, this invention is not limited to a note PC alone. Namely, this invention may be exploited in a desktop PC of space-saving type and/or another electronic equipment of portable type, which has a bus configuration similar to that of a note PC.

As described above, in accordance with this invention, it is possible to add a logic circuit for implementing a special mode called "passthrough" to a bus bridge circuit for use in an information processing system with a plurality of buses, wherein the bus bridge circuit is connected between a primary bus that is not directly accessible to a user and a secondary bus that is directly accessible to a user, thereby enabling to perform nondestructive inspections of transactions on the primary bus from a connector or a slot of the bus bridge circuit to the extent that a failure analysis of the information processing system may be carried out in an easier manner.

Having thus described the invention, what is claimed is:

1. A bus bridge circuit for use in performing in situ inspections of PCI transactions in a notebook personal computer information processing system having a primary PCI bus that is not directly accessible to a user, at least one peripheral device connected to the said primary PCI bus, and a secondary bus that is directly accessible to a user, comprising:
   a control input means for switching operation modes of said bus bridge circuit, which is connected between said primary PCI bus and said secondary bus of the notebook personal computer and for selectively generating a passthrough mode signal; and
   a bypass path comprising a passthrough logic circuit connected in parallel with said bus bridge circuit provided between an input side and an output side of said bus bridge circuit;
   whereby when said passthrough mode signal from said control input means exhibits a first state, said bus bridge circuit is enabled for operation and said bypass path is disabled for operation, thereby causing said bus bridge circuit to be operated in its normal mode; and
   when the passthrough mode signal from said control input means exhibits a second state, said bus bridge circuit is disabled for operation and said bypass path is enabled for operation, thereby causing predetermined bus signals of a plurality of bus signals on said primary bus to be output on said secondary bus;
   whereby in situ inspections of PCI bus transactions are performed during said passthrough mode.

2. The bus bridge circuit as set forth in claim 1, wherein said primary bus is a PCI bus, said secondary bus is a CardBus, said bus bridge circuit is a CardBus controller, and said predetermined bus signals are PCI bus signals that are common to said peripheral devices.

3. The bus bridge circuit as set forth in claim 2, wherein a PCI bus analyzer is connected to said CardBus.

4. The bus bridge circuit as set forth in claim 1, wherein said primary bus is a primary PCI bus, said secondary bus is a secondary PCI bus, said bus bridge circuit is a PCI-PCI bridge circuit, and said predetermined bus signals are primary PCI bus signals that are common to said peripheral devices.

5. The bus bridge circuit as set forth in claim 4, wherein a PCI bus analyzer is connected to said secondary PCI bus.

6. The bus bridge circuit as set forth in claim 1, wherein the state of said passthrough mode signal is determined by the setting of a jumper pin.

7. The bus bridge circuit as set forth in claim 2, wherein the state of said passthrough mode signal is determined by the setting of a jumper pin.

8. The bus bridge circuit as set forth in claim 3, wherein the state of said passthrough mode signal is determined by the setting of a jumper pin.

9. The bus bridge circuit as set forth in claim 4, wherein the state of said passthrough mode signal is determined by the setting of a jumper pin.

10. The bus bridge circuit as set forth in claim 5, wherein the state of said passthrough mode signal is determined by the setting of a jumper pin.

11. An information processing system for a notebook personal computer comprising:
    at least one user input location;
    a primary PCI bus which is not directly accessible from the user input location;
    a secondary bus which is directly accessible from the user input location;
    at least one processing component;
    a plurality of devices connected to the primary PCI bus; and
    a bus bridge circuit comprising a control input means for switching operation modes of said bus bridge circuit, which is connected between said primary PCI bus and said secondary bus and for selectively generating a passthrough mode signal; and a bypass path provided as a passthrough logic circuit connected in parallel with said bus bridge circuit between an input side and an output side of said bus bridge circuit for selectively performing in situ inspections of PCI bus transactions for said notebook Personal computer.

12. A CardBus controller for use in an information processing system comprising a notebook personal computer having a PCI bus, at least one peripheral device connected to the said PCI bus, and a CardBus, comprising:
    a control input means connected between said PCI bus and said CardBus for switching operation modes of said CardBus controller and for selectively generating a passthrough mode signal; and
    a bidirectional bypass path provided between an input side and an output side of said CardBus controller comprising a passthrough logic circuit in parallel with said CardBus controller;
    whereby when a passthrough mode signal from said control input means exhibits a first state, said CardBus controller is enabled for operation and said bypass path is disabled for operation; and
    when the passthrough mode signal from said control input means exhibits a second state, said CardBus controller is disabled for operation and said bypass path is enabled for operation, thereby causing at least those bus signals of a plurality of bus signals on said PCI bus that are common to said PCI devices to be output on said CardBus, whereby in situ inspections of PCI bus transactions are conducted, and causing those bus signals on said CardBus corresponding with said common bus signals to be output on said PCI bus.

13. The CardBus controller as set forth in claim 12, wherein said state of said passthrough mode signal is determined by setting of a jumper pin.

14. The CardBus controller as set forth in claim 12, wherein a PCI bus exerciser is connected to said CardBus.

15. The CardBus controller as set forth in claim 13 wherein a PCI bus exerciser is connected to said CardBus.

16. An information processing system having the CardBus controller for use in an information processing system of a notebook personal computer having a PCI bus, at least one peripheral device connected to the said PCI bus, and a CardBus, comprising:
    a control input means connected between said PCI bus and said CardBus for switching operation modes of said CardBus controller and for selectively generating a passthrough mode signal; and
    a bidirectional bypass path provided in parallel with said control input means between an input side and an output side of said CardBus controller, said bidirectional bypass path comprising a passthrough logic circuit for performing in situ inspections of PCI transactions.

17. A method, in an information processing system for a notebook personal computer having a primary PCI bus that is not directly accessible to a user, at least one peripheral device connected to the primary bus, a secondary bus that is directly accessible to a user and a bus bridge circuit connected between said primary and said secondary bus, said circuit comprising a control input means and a bypass path comprising a passthrough logic circuit connected in parallel between an input and an output side of the bus bridge circuit, for selectively performing in situ inspections of PCI transactions from the primary PCI bus comprising the steps of:

switching operation modes of the bus bridge circuit; and selectively generating a passthrough mode signal; and whereby when said passthrough mode signal from said control input means exhibits a first state, said bus bridge circuit is enabled for operation and said bypass path is disabled for operation, thereby causing said bus bridge circuit to be operated in its normal mode; and when the passthrough mode signal from said control input means exhibits a second state, said bus bridge circuit is disabled for operation and said bypass path is enabled for operation, thereby causing predetermined PCI bus signals of a plurality of bus signals on said primary bus to be output on said secondary bus;

whereby in situ inspections of PCI transactions are performed during said passthrough mode.

18. A method, in an information processing system for a notebook Personal computer having a PCI bus and a CardBus, at least one peripheral device connected to at least one bus, and a CardBus controller circuit connected between said buses, said circuit comprising a control input means and a bypass path between an input and an output side of the bus bridge circuit, for selectively performing in situ inspections of PCI transactions on the PCI bus comprising the steps of:

switching operation modes of said CardBus controller; and selectively generating a passthrough mode signal;

whereby when a passthrough mode signal from said control input means exhibits a first state, said CardBus controller is enabled for operation and said bypass path is disabled for operation; and when the passthrough mode signal from said control input means exhibits a second state, said CardBus controller is disabled for operation and said bypass path is enabled for operation, thereby causing at least those bus signals of a plurality of bus signals on said PCI bus that are common to said PCI devices to be output on said CardBus and those bus signals on said CardBus corresponding with said common bus signals to be output on said PCI bus whereby in situ inspections of PCI bus transactions output on said CardBus are performed during said passthrough mode.

19. The information processing system of claim 16 further comprising transaction inspection means connected to perform inspections of transactions along said CardBus when in passthrough mode.

20. The information processing system of claim 19 wherein the transaction inspection means and CardBus are located in a docking station to which said information processing system is attached.

* * * * *